(12) United States Patent
Winburne et al.

(10) Patent No.: US 11,230,060 B2
(45) Date of Patent: Jan. 25, 2022

(54) ADDITIVE MANUFACTURING WITH VIBRATION-ISOLATING INTERFACE

(71) Applicant: HEWLETT-PACKARD DEVELOPMENT COMPANY, L.P., Spring, TX (US)

(72) Inventors: Robert Lawrence Winburne, Vancouver, WA (US); Joshua Schmale, Vancouver, WA (US); Tait A. Regnier, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 640 days.

(21) Appl. No.: 16/075,681

(22) PCT Filed: Jul. 6, 2017

(86) PCT No.: PCT/US2017/040929
§ 371 (c)(1),
(2) Date: Aug. 6, 2018

(87) PCT Pub. No.: WO2019/009905
PCT Pub. Date: Jan. 10, 2019

(65) Prior Publication Data
US 2021/0197475 A1    Jul. 1, 2021

(51) Int. Cl.
*B29C 64/35* (2017.01)
*B33Y 30/00* (2015.01)
(Continued)

(52) U.S. Cl.
CPC ............ *B29C 64/35* (2017.08); *B29C 64/165* (2017.08); *B29C 64/245* (2017.08);
(Continued)

(58) Field of Classification Search
CPC ...... B22F 12/30; B22F 2202/01; B22F 10/68; B22F 10/70; B29C 64/245; B29C 64/35;
(Continued)

(56) References Cited

U.S. PATENT DOCUMENTS 3,427,034 A    2/1969 Lowe
3,528,144 A *  9/1970 Haponski .............. B28B 1/0873
                                               425/432
(Continued)

FOREIGN PATENT DOCUMENTS

CN    101326046 A    12/2008
CN    203719863 U    7/2014
(Continued)

OTHER PUBLICATIONS

CN203719863U-Machine Translation (Year: 2014).*
(Continued)

*Primary Examiner* — Matthew J Daniels
*Assistant Examiner* — Yunju Kim
(74) *Attorney, Agent, or Firm* — Fabian VanCott

(57) ABSTRACT

In one example in accordance with the present disclosure, an additive manufacturing build unit is described. The additive manufacturing build unit includes a vibrating bed on which a volume of build material is to be disposed. The bed is to vibrate to remove excess build material. A non-vibrating frame of the build unit supports the vibrating bed. The build unit also includes a bed-frame interface to: couple the vibrating bed to the non-vibrating bed frame, and isolate vibrations to the vibrating bed. A flexible seal of the build unit is disposed between the vibrating bed and non-vibrating frame. The flexible seal prevents build material from contaminating an additive manufacturing system in which the
(Continued)

additive manufacturing build unit is disposed and allows relative motion between the vibrating bed and the non-vibrating frame.

20 Claims, 4 Drawing Sheets

(51) Int. Cl.
| | |
|---|---|
| *B33Y 40/00* | (2020.01) |
| *B29C 64/357* | (2017.01) |
| *B29C 64/245* | (2017.01) |
| *B29C 64/165* | (2017.01) |
| *B22F 10/70* | (2021.01) |
| *B22F 12/30* | (2021.01) |
| *B22F 10/68* | (2021.01) |
| *B22F 12/00* | (2021.01) |
| *B22F 10/14* | (2021.01) |
| *B29C 64/25* | (2017.01) |
| *B29C 64/153* | (2017.01) |
| *B33Y 10/00* | (2015.01) |

(52) U.S. Cl.
CPC ............ *B29C 64/357* (2017.08); *B33Y 30/00* (2014.12); *B33Y 40/00* (2014.12)

(58) Field of Classification Search
CPC ....... B29C 64/357; B33Y 30/00; B33Y 40/00; G01M 7/04; B01F 11/0014
USPC ........................................................ 425/456
See application file for complete search history.

(56) References Cited

U.S. PATENT DOCUMENTS

| | | | |
|---|---|---|---|
| 7,285,237 | B2 | 10/2007 | Newell |
| 7,294,274 | B2 | 11/2007 | Kirker et al. |
| 7,497,443 | B1 | 3/2009 | Steinetz et al. |
| 8,185,229 | B2 | 5/2012 | Davidson |
| 9,610,735 | B2 | 4/2017 | Yoo et al. |
| 2008/0241404 | A1 | 10/2008 | Allaman et al. |
| 2015/0266211 | A1 | 9/2015 | Wolfgang et al. |
| 2016/0332371 | A1 | 11/2016 | Staroselsky |
| 2017/0036401 | A1 | 2/2017 | Donovan et al. |
| 2017/0120537 | A1 | 5/2017 | Demuth et al. |
| 2017/0282462 | A1* | 10/2017 | Abe ................ B29C 64/40 |

FOREIGN PATENT DOCUMENTS

| | | |
|---|---|---|
| CN | 106424730 A | 2/2017 |
| EP | 1759791 A1 | 3/2007 |
| EP | 3031552 A2 | 6/2016 |
| EP | 3103569 A1 | 12/2016 |
| EP | 3167984 A1 | 5/2017 |
| WO | 2007039450 A1 | 4/2007 |
| WO | WO-2017017274 | 2/2017 |

OTHER PUBLICATIONS

"ZPrinter® 850", 3DSYSTEMS, Retrieved from Internet: http://infocenter.3dsystems.com/product-library/system/files/legacy/3DSCentral%20-%20Legacy%20Products/850/Customer/Manuals/2210_95030%20ZPrinter%20850%20Quick%20Start%20Guide.pdf, Nov. 1, 2012, 32 pages.

* cited by examiner

ADDITIVE MANUFACTURING WITH VIBRATION-ISOLATING INTERFACE

BACKGROUND

Additive manufacturing devices produce three-dimensional (3D) objects by building up layers of material. Some additive manufacturing devices are referred to as "3D printing devices" because they use inkjet or other printing technology to apply some of the manufacturing materials. 3D printing devices and other additive manufacturing devices make it possible to convert a computer-aided design (CAD) model or other digital representation of an object directly into the physical object.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
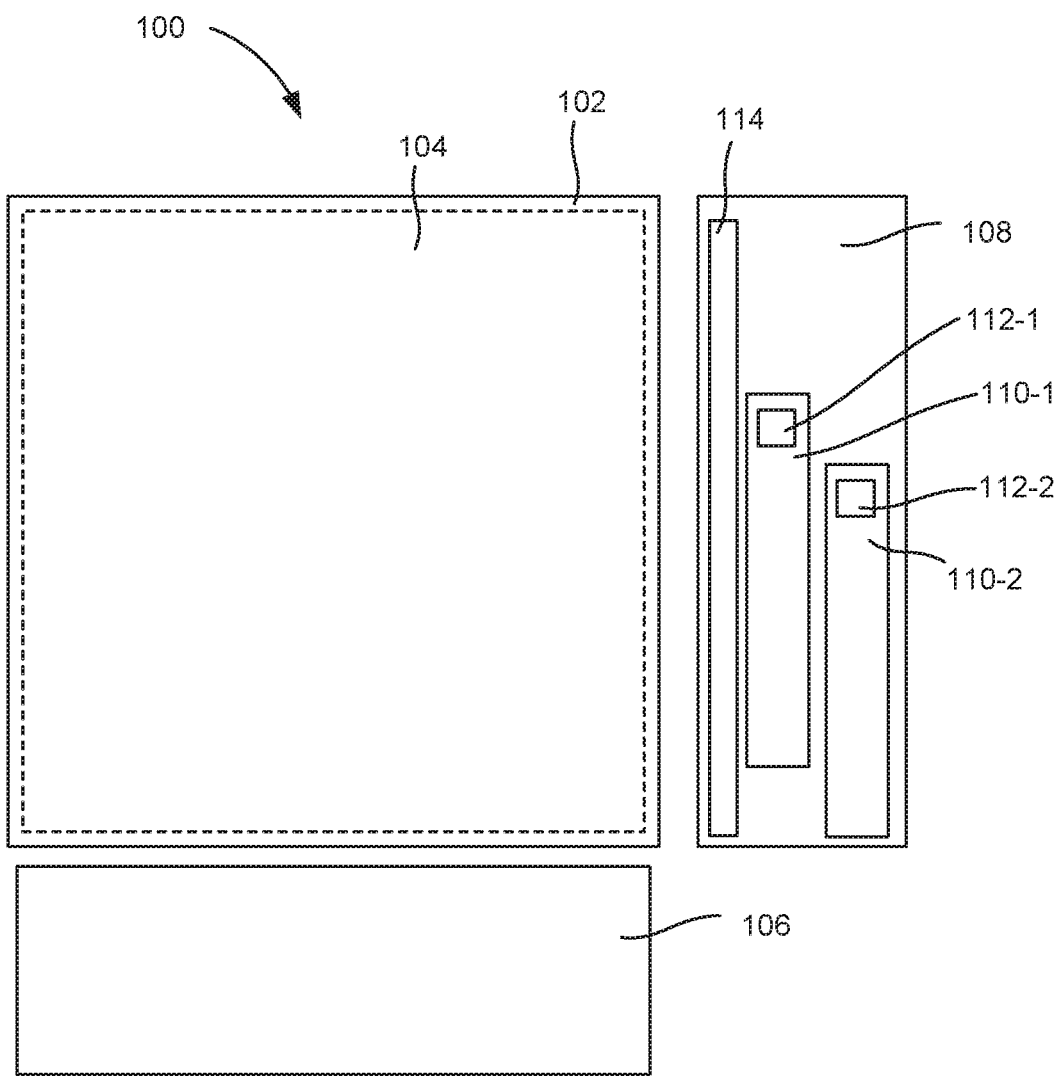
FIG. 1 is a simplified top diagram of an additive manufacturing system with a build unit having a vibration-isolating interface, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Additive manufacturing devices make a three-dimensional (3D) object through the solidification of layers of a build material on a bed within the device. Additive manufacturing devices make objects based on data in a 3D model of the object generated, for example, with a computer-aided drafting (CAD) computer program product. The model data is processed into slices, each slice defining portions of a layer of build material that is to be solidified.

In one, example, to form the 3D object, a build material, which may be powder, is deposited on a bed. A fusing agent is then dispensed onto portions of the layer of build material that are to be fused to form a layer of the 3D object. The system that carries out this type of additive manufacturing may be referred to as a powder and fusing agent based system. The fusing agent disposed in the desired pattern increases the energy absorption of the underlying layer of build material on which the agent is disposed. The build material is then exposed to energy such as electromagnetic radiation. The electromagnetic radiation may include infrared light, laser light, or other suitable electromagnetic radiation. Due to the increased heat absorption properties imparted by the fusing agent, those portions of the build material that have the fusing agent disposed thereon heat to a temperature greater than the fusing temperature for the build material.

Accordingly, as energy is applied to a surface of the build material, the build material that has received the fusing agent, and therefore has increased energy absorption characteristics, fuses while that portion of the build material that has not received the fusing agent remains in powder form. Those portions of the build material that receive the agent and thus have increased heat absorption properties may be referred to as fused portions. By comparison, the applied heat is not so great so as to increase the heat of the portions of the build material that are free of the agent to this fusing temperature. Those portions of the build material that do not receive the agent and thus do not have increased heat absorption properties may be referred to as unfused portions.

Accordingly, a predetermined amount of heat is applied to an entire bed of build material, the portions of the build material that receive the fusing agent, due to the increased heat absorption properties imparted by the fusing agent, fuse and form the object while the unfused portions of the build material are unaffected, i.e., not fused, in the presence of such application of thermal energy. This process is repeated in a layer-wise fashion to generate a 3D object. The unfused portions of material can then be separated from the fused portions, and the unfused portions recycled for subsequent 3D printing operations. While specific reference is made to one type of additive manufacturing process, the principles described herein may apply to other types of additive manufacturing processes.

Accordingly, the present specification describes an improved system and method for separating the unfused build material from the fused build material. According to this system, the device includes an additive manufacturing build unit that includes a bed on which build material is deposited. The bed is to vibrate such that, following formation of a 3D object, unfused build material is 1) separated from the 3D object and 2) directed to ports that return the unfused build material to a build material reservoir.

The build unit may also include non-vibrating components. For example, the frame that holds the bed may include components such as bearings, screws, sensors, and other mechanical and electrical components that, if vibrated too much, may damage those components and affect the overall performance of the additive manufacturing process. Moreover, the build unit may also include components which are desirable to maintain dust free. That is, during 3D printing with a powder material, dust is a common byproduct, which dust can damage the operation of certain components.

Accordingly, the additive manufacturing build unit also includes an interface between the vibrating bed and non-vibrating components of the build unit. The interface isolates the vibration to the vibrating bed such that these non-vibrating components are not vibrated due to the operation of the vibrating bed. More specifically, the interface 1) prevents horizontal motion of the vibrating bed relative to the non-vibrating frame during additive manufacturing, 2) allows the vibrating bed to move relative to the non-vibrating components, in a horizontal plane following additive manufacturing and 3) prevents relative motion of the components in a vertical plane.

The build unit also includes a flexible seal that can deform based on the vibration of the vibrating bed. The seal facilitates the vibration of the vibrating bed while preventing the powder from contaminating other areas within the additive manufacturing system. The flexible seal also centers the vibrating bed within the non-vibrating frame and aids in preventing horizontal motion during 3D printing. In summary, the build unit may refer to the vibrating bed, the non-vibrating frame, and/or the bed-frame interface and flexible seal. In some examples, the build unit, including the vibrating bed and non-vibrating frame, may be removable from an additive manufacturing system such as a 3D printer.

Specifically, the present specification describes an additive manufacturing build unit. The additive manufacturing build unit includes a vibrating bed on which a volume of build material is to be disposed. The bed is to vibrate to remove excess build material. The build unit also includes a non-vibrating frame that supports the vibrating bed. A bed-frame interface 1) couples the vibrating bed to the non-vibrating bed frame and 2) isolates vibrations to the vibrating bed. A flexible seal joins the vibrating bed and the non-vibrating frame. The flexible seal 1) prevents the build material from contaminating other areas of the additive manufacturing system and 2) allows relative motion between the vibrating bed and the non-vibrating frame.

In another example, the additive manufacturing build unit includes the vibrating bed and the non-vibrating frame. In this example, the bed-frame interface 1) couples the vibrating bed to the non-vibrating bed frame, 2) isolates vibrations to the vibrating bed, 3) allows the vibrating bed to move in the horizontal plane when a vibration source is active, and 4) prevents the vibrating bed from moving in the vertical direction relative to the non-vibrating bed frame. The build unit also includes the flexible seal that 1) prevents build material contamination and 2) allows relative motion between the vibrating bed and the non-vibrating frame.

The present specification also describes an additive manufacturing system. The additive manufacturing system includes a build material distributor to successively deposit layers of build material into a build area. At least one agent distributor of the system includes at least one liquid ejection device to selectively distribute fusing agent onto the layers of build material. The additive manufacturing system also includes a build unit on which the build material is to be disposed. The build unit includes the vibrating bed, non-vibrating frame, bed-frame interface, and flexible seal.

In summary, using such an additive manufacturing build unit 1) allows for efficient additive manufacturing processes by re-using unfused build material, 2) increases the amount of unfused build material that is recycled via a vibrating build unit that directs unfused build material to ports, 3) prevents contamination of the additive manufacturing system and prevents powder loss by containing build material within the build area, 4) improves the operating life of the build unit, and associated additive manufacturing system, by isolating vibration to the vibrating bed, and 5) facilitates accurate object creation on a vibrating bed by preventing vertical vibrating and preventing horizontal vibrating during 3D printing. However, it is contemplated that the devices disclosed herein may address other matters and deficiencies in a number of technical areas.

As used in the present specification and the appended claims, the term "build unit" refers to a platform on which a build material is deposited during additive manufacturing, the build unit includes a vibrating bed, a non-vibrating frame, a flexible seal, and a bed-frame interface.

FIG. 1 is a simplified top diagram of an additive manufacturing system (100) with a build unit (102) having a vibration-isolating interface, according to an example of the principles described herein. In general, apparatuses for generating three-dimensional objects may be referred to as additive manufacturing systems (100). The system (100) described herein may correspond to three-dimensional printing systems, which may also be referred to as three-dimensional printers. In an example of an additive manufacturing process, a layer of build material may be formed in a build area (104). As used in the present specification and in the appended claims, the term "build area" refers to an area of space wherein the 3D object is formed. The build area (104) may refer to a space bounded by the build unit (102) and chamber walls.

In the additive manufacturing process, any number of functional agents may be deposited on the layer of build material. One such example is a fusing agent that facilitates the hardening of the powder build material. In this specific example, the fusing agent may be selectively distributed on the layer of build material in a pattern of a layer of a three-dimensional object. An energy source may temporarily apply energy to the layer of build material. The energy can be absorbed selectively into patterned areas formed by the fusing agent and blank areas that have no fusing agent, which leads to the components to selectively fuse together. This process is then repeated until a complete physical object has been formed. Accordingly, as used herein, a build layer may refer to a layer of build material formed in a build area (104) upon which the functional agent may be distributed and/or energy may be applied.

Additional layers may be formed and the operations described above may be performed for each layer to thereby generate a three-dimensional object. Sequentially layering and fusing portions of layers of build material on top of previous layers may facilitate generation of the three-dimensional object. The layer-by-layer formation of a three-dimensional object may be referred to as a layer-wise additive manufacturing process.

In examples described herein, a build material may include a powder-based build material, where the powder-based build material may include wet and/or dry powder-based materials, particulate materials, and/or granular materials. In some examples, the build material may be a weak light absorbing polymer. In some examples, the build material may be a thermoplastic. Furthermore, as described herein, the functional agent may include liquids that may facilitate fusing of build material when energy is applied. The fusing agent may be a light absorbing liquid, an infrared or near infrared absorbing liquid, such as a pigment colorant.

The additive manufacturing system (100) includes a build material distributor (106) to successively deposit layers of the build material in the build area (104). The build material distributor (106) may include a wiper blade, a roller, and/or a spray mechanism. The build material distributor (106) may be coupled to a scanning carriage. In operation, the build material distributor (106) places build material in the build area (104) as the scanning carriage moves over the build area (104) along the scanning axis. While FIG. 1 depicts the build material distributor (106) as being orthogonal to the agent distributor (108), in some examples the build material distributor (106) may be in line with the agent distributor (108).

The additive manufacturing apparatus (100) includes at least one agent distributor (108). An agent distributor (108) includes at least one liquid ejection device (110-1, 110-2) to distribute a functional agent onto the layers of build material.

One specific example of a functional agent is a fusing agent, which increases the energy absorption of portions of the build material that receive the fusing agent. A liquid ejection device (110) may include at least one printhead (e.g., a thermal ejection based printhead, a piezoelectric ejection based printhead, etc.). In some examples, the agent distributor (106) is coupled to a scanning carriage, and the scanning carriage moves along a scanning axis over the build area (104). In one example, printheads that are used in inkjet printing devices may be used as an agent distributor (108). In this example, the fusing agent may be a printing liquid. In other examples, an agent distributor (108) may include other types of liquid ejection devices (110) that selectively eject small volumes of liquid.

The agent distributor (108) includes at least one liquid ejection device (110) that has a plurality of liquid ejection dies arranged generally end-to-end along a width of the agent distributor (108). In such examples, the width of the agent distributor (108) corresponds to a dimension of the build area (104). The agent distributor (104) selectively distributes an agent on a build layer in the build area (104) concurrent with movement of the scanning carriage over the build area (104). In some example apparatuses, the agent distributor (108) includes nozzles (112-1, 112-2) through which the fusing agent is selectively ejected.

The additive manufacturing apparatus (100) also includes at least one heater (114) to selectively fuse portions of the build material to form an object via the application of heat to the build material. A heater (114) may be any component that applies thermal energy. Examples of heaters (114) include infrared lamps, visible halogen lamps, resistive heaters, light emitting diodes LEDs, and lasers. As described above, build material may include a fusible build material that fuses together once a fusing temperature is reached. Accordingly, the heater (114) may apply thermal energy to the build material so as to heat portions of the build material past this fusing temperature. Those portions that are heated past the fusing temperature have a fusing agent disposed thereon and are formed in the pattern of the 3D object to be printed. The fusing agent increases the absorption rate of that portion of the build material. Thus, a heater (114) may apply an amount of energy such that those portions with an increased absorption rate reach a temperature greater than the fusing temperature while those portions that do not have the increased absorption rate to not reach a temperature greater than the fusing temperature. While specific reference is made to deposition of a fusing agent, an additive manufacturing apparatus (100) as described herein may apply any number of other functional agents.

The build unit (102) of the additive manufacturing system (100) includes components to isolate vibration to the bed portion on which the build material is disposed. Specifically, the build unit (102) includes the vibrating bed that holds the volume of build material. A vibration source causes the bed to vibrate to remove excess non-fused build material following formation of a 3D object. The build unit (102) also includes a non-vibrating frame. Installed on the non-vibrating frame are various components, such as lift devices that raise and lower the bed as successive layers of build material are added during the additive manufacturing process. That is, the build unit (102) may move in a vertical direction as successive layers of build material are deposited into the build area (104).

It may be desirable to prevent vibrations caused by the vibrating source to pass to the frame and to ensure the vibrating bed is centered relative to the non-vibrating frame. Accordingly, the build unit (102) includes an interface that couples the vibrating bed with other non-vibrating components and simultaneously isolates vibrations to the vibrating bed. A flexible seal between the vibrating bed and the non-vibrating frame prevents build material contamination into other parts of the build unit (102) and centers the vibrating bed relative to the non-vibrating frame. That is, the flexible seal retains the build material on the bed. The seal also allows the relative motion between the vibrating bed and the non-vibrating bed.

Figure 2:
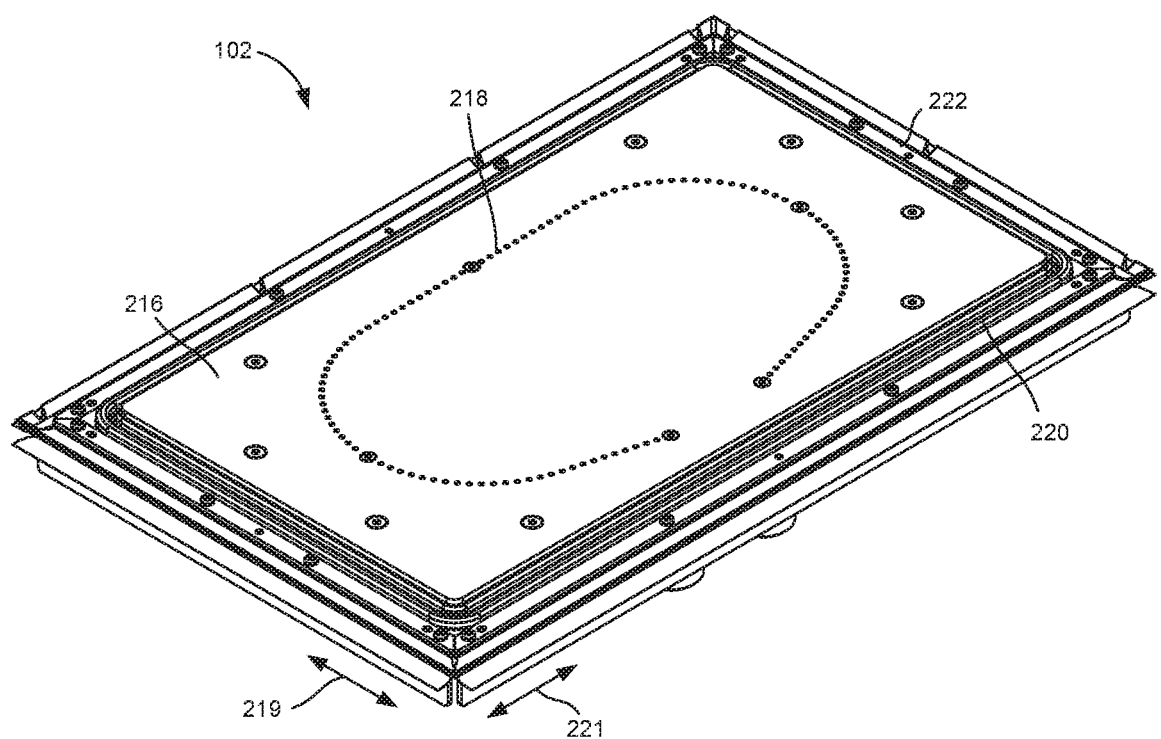
FIG. 2 is an isometric view of an additive manufacturing build unit having a vibration-isolating interface, according to an example of the principles described herein.

FIG. 2 is an isometric view of an additive manufacturing build unit (102) having a vibration-isolating interface, according to an example of the principles described herein. Specifically, FIG. 2 depicts the vibrating bed (216) that in part defines the build area (FIG. 1, 104) where additive manufacturing occurs.

During additive manufacturing, build material is placed on the vibrating bed (216) and the vibrating bed (216) is not vibrating. As successive layers are formed on the vibrating bed (216), the vibrating bed (216) travels downward. Once an entire 3D object is formed, it is removed from the build area (FIG. 1, 104) and the excess, unfused build material remains. This unfused build material can be returned to a reservoir and used in subsequent operations. Accordingly, the bed (216) includes a number of ports (218) through which the unfused built material is drawn to the reservoir. For simplicity, a single port (218) is indicated with a reference number.

Following completion of an additive manufacturing process, the vibrating bed (216) is activated such that it vibrates in the horizontal plane as defined by the arrows (219, 221). Such vibration moves the build material around the bed (216) such that it is drawn into the ports (218) to be transferred to the reservoir.

However, not all of the components of the build unit (102) are intended to vibrate. That is, the bed (216) may vibrate, but for other components, it may be desirable that they do not vibrate. For example, outside of the vibrating bed (216) there may be other mechanical devices such as bearings, screws, motors, and electrical connections which could be damaged. Accordingly, the present specification describes a build unit (102) that 1) facilitates the vibration of the bed (216) while preventing vibration of the other components. Such a build unit (102) includes an interface for allowing such relative motion, which interface is depicted in FIGS. 3 and 4.

The build unit (102) also includes a flexible seal (220). As described above, some components of the build unit (102) may benefit from a lack of vibration. Such components, and others, may also benefit from a lack of contamination by the build material. That is, during vibration to move the unfused build material towards the ports (218), the powder material may lift off the bed (216) and move about over the build unit (102). Moreover, during printing, the impact of the fusing agent onto the build material, may cause particulate matter to lift off the bed (216). Such particulate matter, however it is generated, can impact the performance of various components. The flexible seal prevents this contamination. That is, the flexible seal (220) allows for relative motion of the vibrating bed (216) with the non-vibrating frame (222) while sealing components of the additive manufacturing system against contamination by the build material particulate matter. For example, the flexible seal (220) can prevent the particulate matter from coming into contact with components that are beneath the build unit (102). As can be seen in FIG. 2, the flexible seal (222) in some examples, is a closed form that encloses the vibrating bed (216). In so doing, the flexible seal (222) retains the build material within the build area (FIG. 1, 104).

The additive manufacturing build unit (102) as described herein allows for the easy separation of unfused build material from fused build material that has been formed as part of a 3D object. The interface described herein isolates any vibration to be localized to the vibrating bed (216) and prevents these vibrations from reaching the non-vibrating frame (222).

Figure 3:
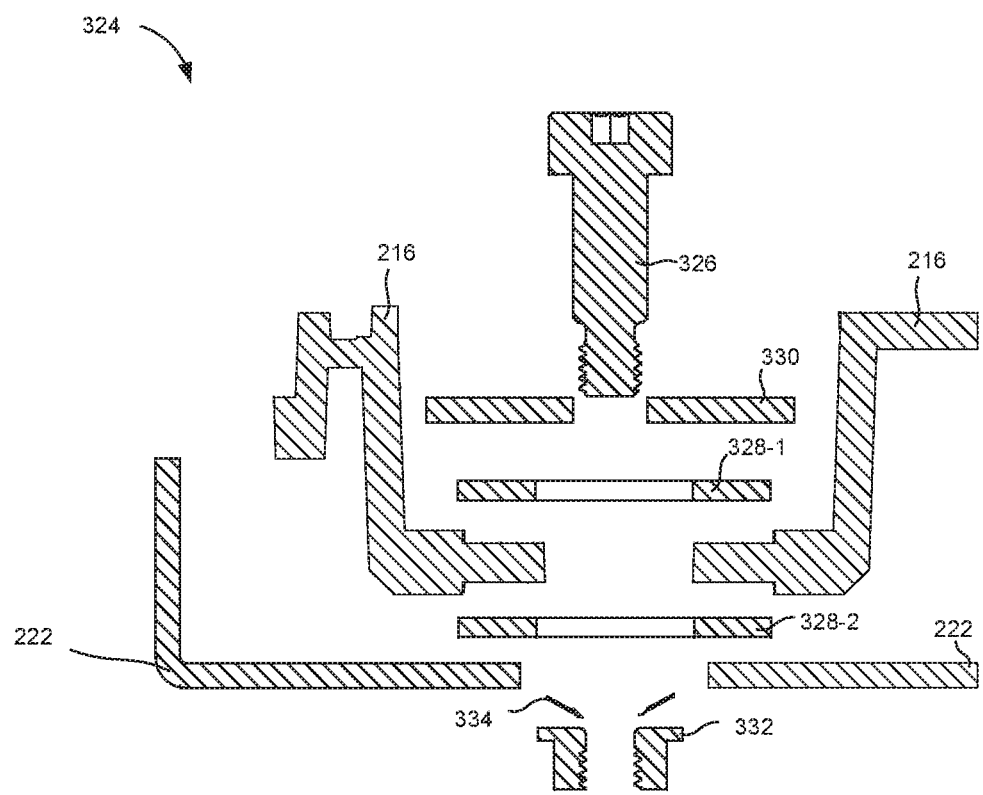
FIG. 3 is an exploded cross-sectional view of an additive manufacturing build unit with a vibration-isolating interface, according to an example of the principles described herein.
Figure 4:
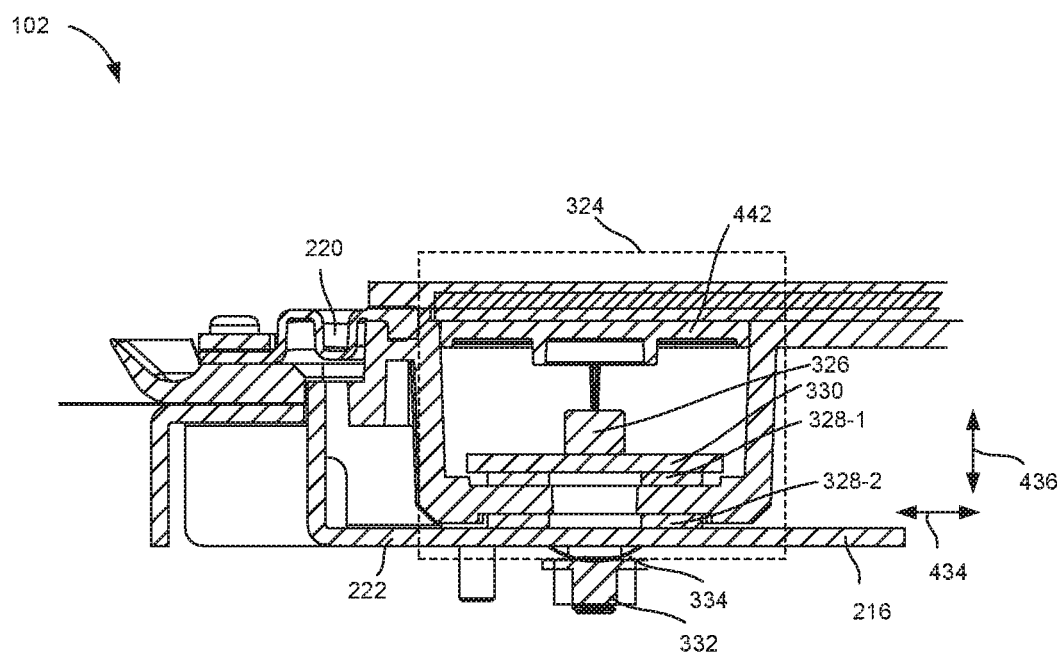
FIG. 4 is a cross-sectional diagram of an additive manufacturing build unit with a vibration-isolating interface, according to an example of the principles described herein.

FIG. 3 is an exploded view of a vibration-isolating interface (324), according to an example of the principles described herein. As described above, the additive manufacturing build unit (FIG. 1, 102) includes a vibrating bed (216) that vibrates following additive manufacturing to remove excess unfused build material from the build area (FIG. 1, 104) to a reservoir to be held for subsequent additive manufacturing operations. However, during additive manufacturing, the vibrating bed (216) is held rigid such that 3D objects are accurately generated.

The additive manufacturing build unit (FIG. 1, 102) also includes a non-vibrating frame (222). The non-vibrating frame (222) supports the vibrating bed (216) as well as other components found within the additive manufacturing system (FIG. 1, 100). For example, during additive manufacturing, the vibrating bed (216) may be lowered such that additional layers of build material may be deposited and fused. The non-vibrating frame (222) may support the lift mechanism that facilitates this raising and lowering. Following additive manufacturing, the vibrating bed (216) is vibrated to draw excess unfused build material to the reservoir. The resultant vibrations, if allowed to pass to the non-vibrating frame (222) may damage these other components including the lift mechanism, bearings, and screws as well as other electrical and mechanical components. Accordingly, the build unit (FIG. 1, 102) includes a bed-frame interface (324) to couple these components. Specifically, within the bed-frame interface (324), there are components that couple the vibrating bed (216) to the non-vibrating bed frame (222) and that also isolate vibrations to the vibrating bed (216).

Specifically, the bed-frame interface (324) includes a number of movement restriction devices to 1) allow the vibrating bed (216) to move in a horizontal plane following additive manufacturing, 2) prevent horizontal motion during printing, when a vibration source is not active, and 3) prevent the vibrating bed from moving in the vertical direction relative to the non-vibrating frame (222). The movement restriction devices may be disposed around the edges of the vibrating bed (216). That is, the vibrating bed (216) may be surrounded by the flexible seal (FIG. 2, 220) and the bed-frame interface (324) and the movement restriction devices may be disposed in corners of the bed-frame interface (324).

Returning to the motion restriction devices. In some examples, these components work to allow motion in certain directions and prevent motion in other directions. For example, the bed-frame interface (324) includes a bolt (326) to pass through a vibrating bed (216) opening and a non-vibrating frame (222) opening. A first low friction bearing (328-1) is juxtaposed between a washer (330) and the vibrating bed (216). A second low friction bearing (328-2) is juxtaposed between the non-vibrating frame (222) and the vibrating bed (216).

Tightening a nut (332) on the bottom of the bolt (326) compresses these components together such that adjacent surfaces are in contact with one another. In so doing, the nut (332) and bolt (326) restrict relative movement in the vertical direction (436). However, to ensure that the nut (332) isn't overtightened, such that the components coupled to the bolt (326) would not move relative to one another in the horizontal plane, a spring (334), and in some cases a groove cut into the bolt (326) ensure that the nut (332) is not overtightened.

The compression of the components also ensures rigidity of the vibrating bed (216) during manufacturing. That is, there may be sufficient friction between these components that during additive manufacturing, when a vibration source is inactive, the components do not move relative to one another in a horizontal plane. The friction force, which is a function of the pressure exerted by the tightening the nut (332) against the spring (334), is such that it is overcome by the activation of the vibration source. That is, the forces caused by the vibration source overcome the friction force, and allows the vibrating bed (216) to vibrate.

This motion restriction device allows, while a vibration source is active, for the vibrating bed (216) to move in a horizontal plane relative to the non-vibrating frame (222) and prevents such relative motion in a vertical direction. Vertical motion can have a negative impact on 3D printed object quality. That is, if the vibrating bed (216), on which the 3D object is formed, moves in a vertical direction relative to the non-vibrating frame (222), the thickness of the build material may vary, which results in a lack of accuracy of the part and/or result in other imperfections in the additive manufacturing process. Accordingly, as vertical motion can have a negative impact on 3D object accuracy, the interface that prevents this motion allows for more accurate 3D printing. Additional detail regarding the operation of a motion restriction device is provided below in regards to FIG. 4.

FIG. 4 is a cross-sectional diagram of a portion of an additive manufacturing build unit (102) with a vibration-isolating interface (324), according to an example of the principles described herein. Clearly depicted in FIG. 4 is the vibrating bed (216) and the non-vibrating frame (222). As described above, the vibrating bed (216) is allowed to vibrate in a horizontal plane when a vibration source is active, but is prevented from vibrating in the horizontal plane when the vibration source is not active. That is, during removal of unfused build material, the vibrating bed (216) moves in a direction indicated by the arrow (434) as well as a direction perpendicular, but in a horizontal plane. The flexible seal (220) allows for such movement. For example, the flexible seal (220) may be formed of a deformable silicon material, and may have an S-shaped cross section. Accordingly, as the vibrating bed (216) vibrates in the direction indicated by the arrow (434), the flexible seal (220) deforms to allow the movement, but still provides a sealed surface underneath the flexible seal (220). The flexible seal (220) also serves to center the vibrating bed (216) relative to the non-vibrating frame (222) and prevents horizontal motion during additive manufacturing, i.e., when a vibration source is inactive. As depicted in FIG. 4, the flexible seal (220) is fixedly attached to both the vibrating bed (216) and the non-vibrating frame (222).

The flexible seal (220) also prevents build material contamination. That is, those components whose performance may degrade due to the presence of particulate build material, may be shielded below the vibrating bed (216) and build material prevented from going therein by the flexible seal (220).

FIG. 4 also clearly depicts the movement restriction device. As described above, the movement restriction device can be any device that allows for movement in one plane, i.e., a horizontal plane, but prevents motion in a perpendicular direction, i.e., a vertical direction as indicated by the arrow (436). Allowing motion in the horizontal plane facilitates unfused build material removal and preventing motion in the vertical direction enhances the efficiency of 3D object generation.

In one specific example, the movement restriction device includes a bolt (326) that passes through, from top to bottom, a washer (330), a first low friction bearing (328-1), an opening in the vibrating bed (216), a second low friction bearing (328-2), and an opening in the non-vibrating frame (222). FIG. 4 also depicts the nut (332) on the bottom of the bolt (326) that compresses these components together such that adjacent surfaces are in contact with one another. However, movement in the horizontal plane is still allowed when the vibration source is active, via the low friction bearings (328). Specifically, due to a friction force between the low friction bearings (328) and the vibrating bed (216), there is no relative motion between the vibrating bed (216) and the low friction bearings (328) even when the vibration source is active. That is, they move together. However, surfaces of the low-friction bearings (328) that are in contact with the washer (330) and the non-vibrating frame (222), respectively, are formed of a low friction material, that allows the bearings (328) to slide along the respective surfaces of the washer (330) and the non-vibrating frame (222) when the vibration source is active. In some examples, the low-friction bearings (328) may be formed of polytetrafluoroethylene, a teflon impregnated composite, or other Teflon-based material. The openings of each of these components is larger than an outside diameter of the bolt (326) such that they can slide about the axis of the bolt (326). Accordingly, the vibrating bed (216) and low friction bearings (328) vibrate, while the washer (330), bolt (326), and non-vibrating frame (222) are not vibrated.

In some examples, the movement restriction device includes a spring (334) to maintain a predetermined pressure on the contact surfaces of the bolt (326), washer (330), low friction bearings (328), vibrating bed (216), and non-vibrating frame (222). That is, if the nut (332) is overtightened, the friction forces between the surfaces, even those of the low-friction bearings (328), may be so great as to prevent horizontal motion even when the vibration source is active. That is, the spring (334) generates the predetermined pressure and facilitates a simple way of tightening the nut (332) to achieve this pressure.

The predetermined pressure may be such that during additive manufacturing there is no horizontal motion, but following additive manufacturing, when a vibration source is operating, there is horizontal motion. That is, during additive manufacturing there is sufficient friction between these components and the flexible seal (220) has enough rigidity, that there is no motion in the horizontal plane. Then, following additive manufacturing, as a vibration source activates to vibrate the bed (216), this friction and rigidity of the flexible seal (220) is overcome such that the vibrating bed (216) vibrate in the horizontal plane.

Still further, in some examples, the motion restriction device includes a cap (442) to prevent contamination of the motion restriction device by particulate build material that could, if allowed to enter, degrade the performance of the motion restriction device.

The motion restriction device as described herein, allows the vibrating bed (216) to vibrate about the bolt (326), but also prevents differences in vertical movement of the vibrating bed (216) relative to the non-vibrating frame (222). Preventing such relative vertical motion increases the efficiency of 3D object formation. Allowing vibration of the vibrating bed (216) facilitates the efficient removal of particulate matter following 3D object formation.

In summary, using such an additive manufacturing build unit 1) allows for efficient additive manufacturing processes by re-using unfused build material, 2) increases the amount of unfused build material that is recycled via a vibrating build unit that directs unfused build material to ports, 3) prevents contamination of the additive manufacturing system, and prevents powder loss by containing build material within the build area, 4) improves the operating life of the build unit, and associated additive manufacturing system, by isolating vibration to the vibrating bed, and 5) facilitates accurate object creation on a vibrating bed by preventing vertical vibrating. However, it is contemplated that the devices disclosed herein may address other matters and deficiencies in a number of technical areas.

The preceding description has been presented to illustrate and describe examples of the principles described. This description is not intended to be exhaustive or to limit these principles to any precise form disclosed. Many modifications and variations are possible in light of the above teaching.

What is claimed is:

1. An additive manufacturing platform comprising:
    a vibrating bed on which a volume of build material is to be disposed, which bed is to vibrate to remove excess build material;
    a non-vibrating frame to support the vibrating bed, wherein a portion of the vibrating bed rests on the non-vibrating frame; and
    a bed-frame interface to couple the vibrating bed to the non-vibrating bed frame, and isolate vibrations to the vibrating bed, the bed-frame interface comprising a stop above the vibrating bed to prevent the vibrating bed from moving vertically away from the non-vibrating frame, but allowing the vibrating bed to slide horizontally with respect to the non-vibrating frame; and
    a flexible seal between the vibrating bed and non-vibrating frame to prevent build material contamination, and allow relative motion between the vibrating bed and the non-vibrating frame.

2. The platform of claim 1, wherein the bed-frame interface includes a number of movement restriction devices, including the stop, to:
    allow the vibrating bed to move in the horizontal plane when a vibration source is active;
    prevent the vibrating bed from moving in the horizontal plane when the vibration source is inactive; and
    prevent the vibrating bed from moving in the vertical direction relative to the non-vibrating frame.

3. The platform of claim 1, wherein the bed-frame interface comprises:
    a bolt to pass through a vibrating bed opening and a non-vibrating frame opening;
    a nut to engage with the bolt to secure together the vibrating bed and the non-vibrating frame;
    a first low-friction bearing juxtaposed between the non-vibrating frame and the vibrating bed; and
    a second low-friction bearing juxtaposed between the vibrating bed and a washer, wherein the stop comprises the washer.

4. The platform of claim 3, wherein the bolt comprises a groove to prevent overtightening the nut.

5. The platform of claim 3, wherein the bed-frame interface further comprises a spring disposed between the nut and the non-vibrating frame to regulate pressure applied.

6. The platform of claim 3, wherein the low friction bearings are formed of a polytetrafluoroethylene compound.

7. The platform of claim 1, wherein the flexible seal has an s-shaped cross-section.

8. The platform of claim 1, wherein the flexible seal is formed of a deformable silicone material, rubber, or fluoroelastomer material.

9. The platform of claim 1, wherein the stop comprises a washer and the interface further comprises a bolt extending through the washer, an opening in the vibrating bed and an opening in the non-vibrating frame to secure the vibrating bed to the non-vibrating frame, the opening in the vibrating bed being larger than a diameter of the bolt to permit lateral movement of the vibrating bed with respect to the bolt.

10. The platform of claim 9, further comprising:
a nut to receive an end of the bolt below the non-vibrating frame; and
a spring disposed between the nut and a bottom surface of the non-vibrating frame.

11. The platform of claim 9, wherein the vibrating frame comprises a recess in which the bolt and washer are received, the recess extending below a surface of the vibrating bed on which the build material is to be disposed, the recess forming a downward extending portion of the vibrating frame that rests on the non-vibrating frame.

12. The platform of claim 11, a bottom of the recess having a groove on both sides of the vibrating frame to receive a bearing therein, the interface further comprising a first bearing between the washer and vibrating bed and a second bearing between the vibrating bed and the non-vibrating frame, both bearings received in a respective groove on opposite sides of the vibrating frame.

13. An additive manufacturing platform comprising:
a vibrating bed on which a volume of build material is to be disposed, which bed is to vibrate to remove excess non-fused build material;
a non-vibrating frame to support the vibrating bed, wherein a portion of the vibrating bed rests on the non-vibrating frame; and
a bed-frame connector to secure the vibrating bed to the non-vibrating frame, the bed-frame connector to:
allow the vibrating bed to move in the horizontal plane when a vibration source is active;
prevent the vibrating bed from moving in the horizontal plane when the vibration source is inactive; and
prevent the vibrating bed from moving in the vertical direction; and
a flexible seal between the vibrating bed and non-vibrating frame to:
prevent build material contamination; and
allow relative motion between the vibrating bed and the non-vibrating frame.

14. The platform of claim 13, wherein the flexible seal:
is a closed form that encloses the vibrating bed; and
centers the vibrating bed within the non-vibrating frame.

15. The platform of claim 13, wherein the bed-frame connector comprises a number of fasteners disposed in corners of the bed-frame interface.

16. The platform of claim 15, wherein each bed-frame connector further comprises a cap to prevent contamination of the connector.

17. The platform of claim 13, wherein the connector comprises a bolt extending through all of a washer, an opening in the vibrating bed and an opening in the non-vibrating frame to secure the vibrating bed to the non-vibrating frame, the opening in the vibrating bed being larger than a diameter of the bolt to permit lateral movement of the vibrating bed with respect to the bolt.

18. An additive manufacturing system comprising:
a build material distributor to successively deposit layers of build material into a build area;
at least one agent distributor including at least one fluid ejection device to selectively distribute fusing agent onto the layers of build material; and
a platform that defines a build area, wherein the platform comprises:
a vibrating bed on which a volume of build material is to be disposed, which bed vibrates to remove excess build material;
a non-vibrating frame to support the vibrating bed; and
a bed-frame interface comprising a fastener extending through the vibrating bed and non-vibrating frame to secure the vibrating bed to the non-vibrating frame, the fastener to:
prevent vertical movement of the vibrating bed away from the non-vibrating bed frame; and
permit the vibrating bed to slide horizontally over the non-vibrating frame during vibration of isolate vibrations to the vibrating bed; and
a flexible seal between the vibrating bed and non-vibrating frame to:
prevent build material contamination; and
allow relative motion between the vibrating bed and the non-vibrating frame.

19. The additive manufacturing system of claim 18, wherein the platform moves in a vertical direction as successive layers of build material are deposited into the build area.

20. The additive manufacturing system of claim 18, wherein the flexible seal has a cross-section that allows for relative motion.

* * * * *